United States Patent [19]

Shirakawa et al.

[11] Patent Number: 5,515,231
[45] Date of Patent: May 7, 1996

[54] THYRISTOR VALVE ARRESTER AND DC POWER TRANSMISSION THYRISTOR VALVE USING THE SAME

[75] Inventors: Shingo Shirakawa; Shuichi Terakado, both of Hitachi, Japan

[73] Assignee: Hitachi, Ltd., Tokyo, Japan

[21] Appl. No.: 145,220

[22] Filed: Nov. 3, 1993

[30] Foreign Application Priority Data

Nov. 18, 1992 [JP] Japan ................................. 4-308977

[51] Int. Cl.$^6$ ................................................. H02H 9/06
[52] U.S. Cl. ............................. 361/128; 363/54; 327/438
[58] Field of Search .................................. 361/10, 11, 18, 361/98, 56, 128, 130; 307/219; 363/51, 52, 53, 54

[56] References Cited

U.S. PATENT DOCUMENTS

| | | | |
|---|---|---|---|
| 3,601,632 | 8/1971 | Frazier | 307/219 |
| 4,819,983 | 3/1989 | Yoshizumi et al. | 363/54 |

FOREIGN PATENT DOCUMENTS

| | | |
|---|---|---|
| 0190547 | 2/1985 | European Pat. Off. . |
| 5-190256 | 7/1993 | Japan . |

OTHER PUBLICATIONS

Siemens Power Engineering and Automation, vol. VII, No. 5, 1985, "Metal–Oxide Surge Arresters for the Thyristor Valves of the Durnrohr HVDC Back–to–Back Converter Station", M. Crucius et al, pp. 352–355.

IEEE, 1988, 88 WM 031-7, "Power Dissipation Characteristics of Zinc-Oxide Arresters for HVDC Systems", S. Horiuchi et al, pp. 1–6.

'92 National Meeting of the Society of Electrical Engineering, S13-10, "Arrester for AC/DC Conversion Station".

Primary Examiner—Todd DeBoer
Attorney, Agent, or Firm—Fay, Sharpe, Beall, Fagan, Minnich & McKee

[57] ABSTRACT

An object of the present invention is to provide a thyristor valve arrester capable of measuring leakage currents of arrester elements in a simple construction and a DC power transmission thyristor valve having it used therein.

A multiple of laminated arrester sets are arranged in parallel with a multiple of thyristor valves. Each arrester set is made of a plurality of arrester units arranged in parallel. Each adjoining arrester sets has through an insulator an inter-stage connecting conductor therebetween at a position corresponding to the respective thyristor valve terminals. An end of each arrester set and the respective inter-stage connecting conductors have a leakage current ammeter and a surge counter connected therebetween in electrical parallel. Each inter-stage connecting conductor and the respective thyristor valve stage are connected together by a thyristor valve connecting conductor.

9 Claims, 5 Drawing Sheets

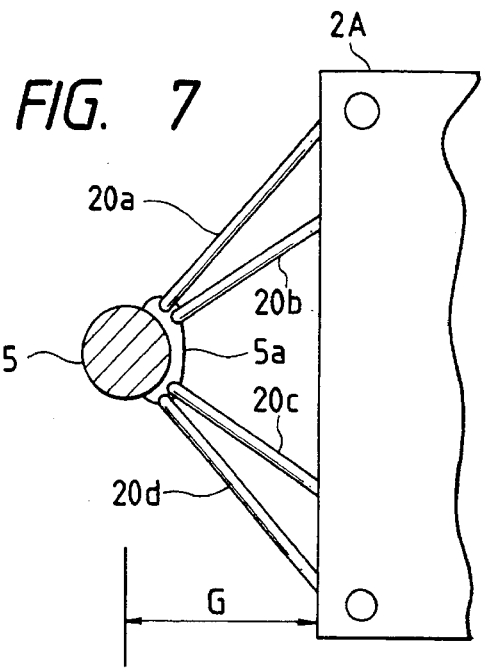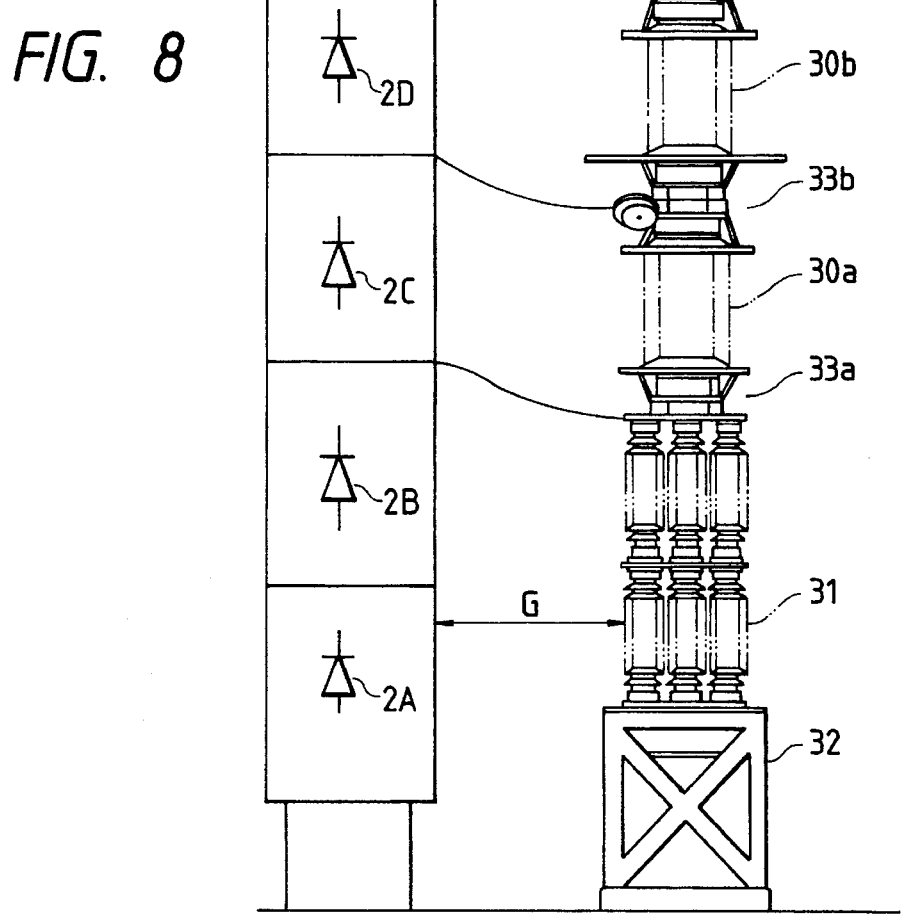

THYRISTOR VALVE ARRESTER AND DC POWER TRANSMISSION THYRISTOR VALVE USING THE SAME

BACKGROUND OF THE INVENTION

1. Field of the Invention

This invention relates to an arrester used for protecting a direct current power transmission thyristor valve from an overcurrent, and a direct current power transmission valve using such an arrester.

2. Description of the Related Art

Practical application of a direct current power transmission thyristor valve has been promoted in recent years with the increase in demand for electric power, and its operation voltage has increased from DC 125KV to 250KV and to 500KV to accomplish a high voltage and a large current.

To make an economical insulation design of such a direct current power transmission thyristor valve, an excellent arrester valve is necessary. However, such direct current power transmission thyristor valves are stacked into four stages and are electrically connected in series with one another. Therefore, the overall height becomes about 11 m to about 15 m. If the arrester used for protecting such a direct current power transmission thyristor valve from overvoltage is accommodated in a single insulator and is so stacked into four stages as to correspond to each stage in the same way as in the case of ordinary alternating current arresters formed by accommodating an arrester element in a single insulator, sufficient vibration resistance cannot be obtained. Therefore, as described in a papers of the '92 National Meeting of the Society of Electrical Engineering, S13-10, entitled "Arrester for AC/DC Conversion Station", a construction wherein the arrester is directly mounted to the main body of the thyristor valve has been proposed.

However, with the DC power transmission thyristor valve constructed in such a way as described above, in testing the withstand voltage of the thyristor valve, the thyristor valve arrester must be separated from the DC power transmission thyristor valve so as not to affect the insulation of the thyristor valve arrester. After this, they must be assembled together. These are rather troublesome procedures.

To solve the foregoing problems of the related art, the a thyristor valve arrester has been proposed as shown in the Japanese Published Patent Application No. 5-190256.

FIG. 8 illustrates the proposal, in which there are two stacked stages of arrester units 30a and 30b in view, each of which has an arrester element in a supporting bushing. The two stacked stages are mounted through a plurality of supporting bushings 31 on a base 32. There is also provided another assembly like the one shown in FIG. 8. These assembly stages are electrically connected in series to form a thyristor valve arrester of four arrester element stages. Each stage is connected with the respective stage of the thyristor valve through a conductor. However, the proposed thyristor valve arrester must have for each assembly set additional structures 33a and 33b for supporting the two stacked stages of arrester units 30a and 30b. The proposed thyristor valve arrester also must be isolated by a distance G of around 5 m from the thyristor valves 2A to 2D to be insulated As a result, the proposed thyristor valve arrester needs a large installation area and is complicated in the structure.

The thyristor valve arrester of the kind described above uses zinc oxide elements as arrester elements. Their insulation deterioration must be monitored by measurement of leakage current. The usual AC arrester can have a current transformer put in its grounding end, to easily detect a leakage current of around a few milliamperes. On the other hand, the thyristor valve arrester units 30a and 30b shown in FIG. 8, they are insulated from ground by the plurality of supporting bushings 31, and the leakage current cannot be easily measured. They also would be affected by a transient translocation surge current of around hundreds of milliamperes due to the translocation vibrating voltage of the thyristor valve. The ammeter therefore must be capable of measuring the leakage current of the thyristor valve arrester from as little as a few milliamperes to hundreds of milliamperes.

SUMMARY OF THE INVENTION

In view of solving the foregoing problems of the prior arts, it is an object of the present invention to provide a thyristor valve arrester capable of measuring the leakage current of an arrester element in a simple construction and a DC power transmission thyristor valve having it used therein.

Briefly, the foregoing object is accomplished in accordance with aspects of the present invention by a thyristor valve arrester and a DC power transmission thyristor valve having the same used therein.

The present invention provides a thyristor valve arrester, comprising arrester sets which are connected to respective stages of a multi-stage thyristor valve, with a feature that the arrester sets lock have an inter-stage connecting conductor arranged therebetween through an insulator, these arrester sets and the inter-stage connecting conductors being stacked virtually vertically, and one end of each of the arrester sets and the inter-stage connecting conductor having a leakage current ammeter and a surge counter electrically connected in parallel therebetween.

The present invention also provides a thyristor valve arrester with a feature that it is constructed in a way that the arrester sets each have an inter-stage connecting conductor arranged therebetween through an insulator, and these arrester sets and the inter-stage connecting conductors are stacked virtually vertically, the thyristor valve arrester being arranged in parallel with the thyristor valve, and one end of each of the arrester sets and the inter-stage connecting conductor having a leakage current ammeter and a surge counter electrically connected in parallel therebetween.

The present invention further provides a feature that the thyristor valve connecting conductor for connecting each of the thyristor valves with the respective arrester set stages has one end thereof connected to the inter-stage connecting conductor.

As the thyristor valve arrester of the present invention has an inter-stage connecting conductor provided on one end of the arrester set through an insulator and has the leakage current ammeter and the surge counter connected between one end of the arrester set and the inter-stage connecting conductor, the leakage current can be measured at a high accuracy without being affected by the transient translocation surge current.

Also, as the DC power transmission thyristor valve of the present invention has the thyristor valve arranged in parallel with the thyristor valve arrester of a multiple of the stacked arrester set stages, the axial lengths of the connecting conductors in the stacking direction can be properly selected. This can simplify construction of the thyristor valve connecting conductors for connection of the thyristor valve arrested stages with the corresponding thyristor valve stages, thereby simplifying construction of the whole apparatus.

BRIEF DESCRIPTION OF THE DRAWINGS

In the accompanying drawings:

FIG. 7 is a cross-sectional plan view taken across VII—VII of the DC power transmission thyristor valve shown in FIG. 6.

FIG. 8 is a front view illustrating a related thyristor valve arrester.

DETAILED DESCRIPTION OF THE PREFERRED EMBODIMENT

The following describes in detail embodiments according to the present invention by reference to the accompanying drawings.

Figure 1:
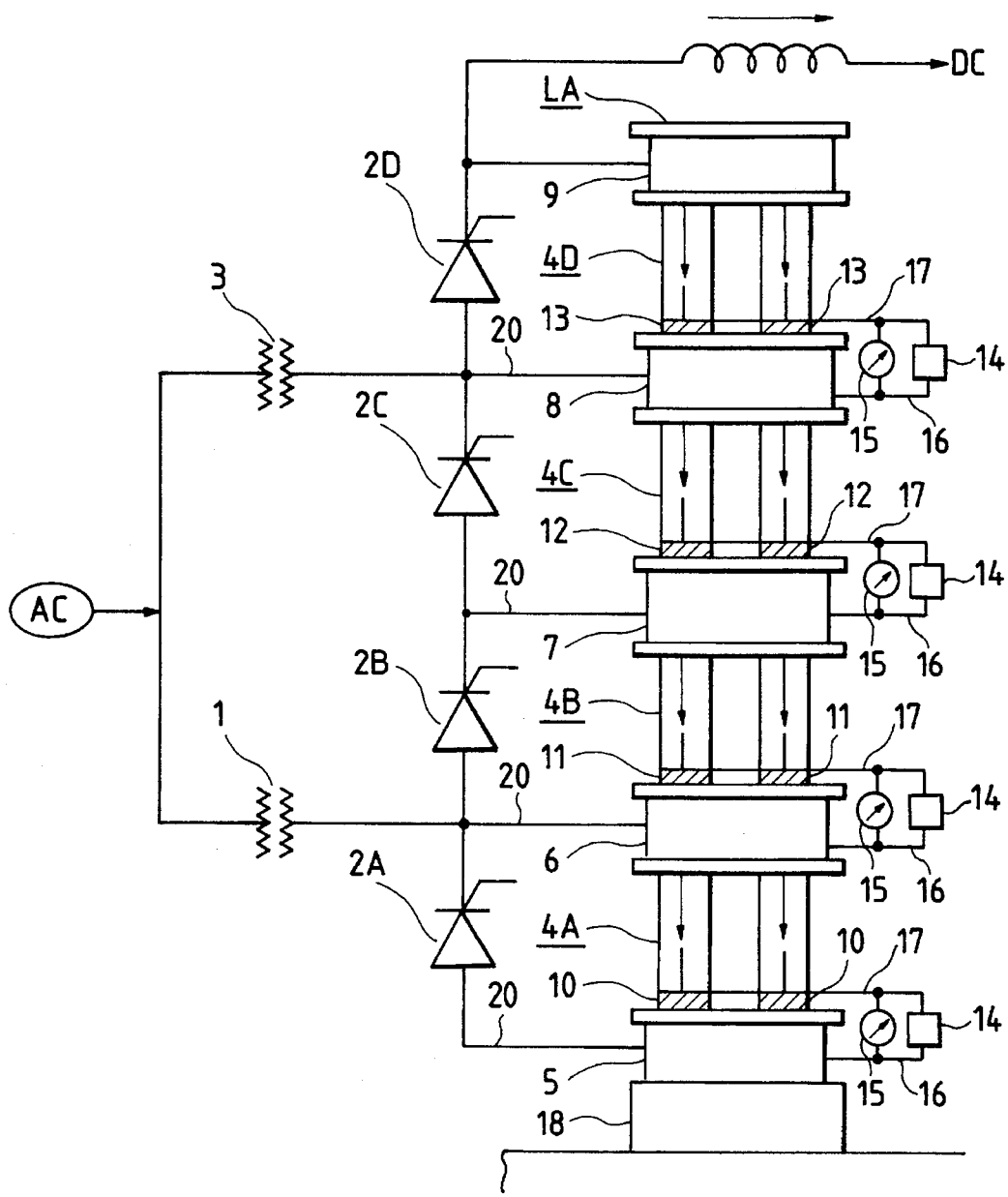
FIG. 1 is a schematic diagram illustrating a front view of a DC power transmission thyristor valve that is an embodiment of the present invention.

FIG. 1 depicts a schematic diagram illustrating a front view of a DC power transmission thyristor valve that is an embodiment of the present invention.

In the figure, inputs of DC power transmission thyristor valves 2A to 2D are connected to an alternating current power source AC through converting transformers 1 and 3. The DC power transmission thyristor valves 2A to 2D feed out direct current power DC from their outputs. Each of the four-stage thyristor valves 2A to 2D is connected in parallel with their respective arrester sets 4A, 4B, 4C, and 4D having a zinc oxide element each. The arrester sets 4A, 4B, 4C, and 4D are vertically stacked to four stages to form a thyristor valve arrester LA.

A mounting surface of each arrester set has an inter-stage connecting conductor which is attached thereto which is The inter-stage connecting conductor 5 on which the arrester set 4A is mounted is insulated from ground by an insulating supporter 18, and has a flange formed on its upper portion. The upper portion of the inter-stage connecting conductor 5 is connected with the bottom of the above- arrester set 4A through an insulator 10. The inter-stage connecting conductor 5 and the bottom of the arrester set 4A, therefore, are insulated therebetween by the insulator 10. The arrester set 4A and inter-stage connecting conductor 5, however, are electrically connected by a leakage current ammeter 15 and a surge counter 14 connected electrically in parallel between a conductor 17 connected with the bottom of the arrester set 4A and a conductor 16 connected with the inter-stage connecting conductor 5.

The arrester set 4A has an inter-stage connecting conductor 6 having a flange arranged on each end. The top of the arrester set 4A and a lower flange of the inter-stage connecting conductor 6 are electrically connected therebetween directly. Similarly, the bottom end of the arrester set 4B is connected with the upper flange of the inter-stage connecting conductor 6 through an insulator 11, and the top of the arrester set 4B and the lower flange of the inter-stage connecting conductor 7 having the flange each end are electrically connected therebetween directly. The other arrester sets 4C and 4D are structured like the arrester sets 4A and 4B. As a result, four arrester sets 4A to 4D are vertically stacked. The inter-stage connecting conductors 6 to 9 are connected with the four stacked thyristor valves 2A to 2D through respective thyristor valve connecting conductors 20.

Figure 2:
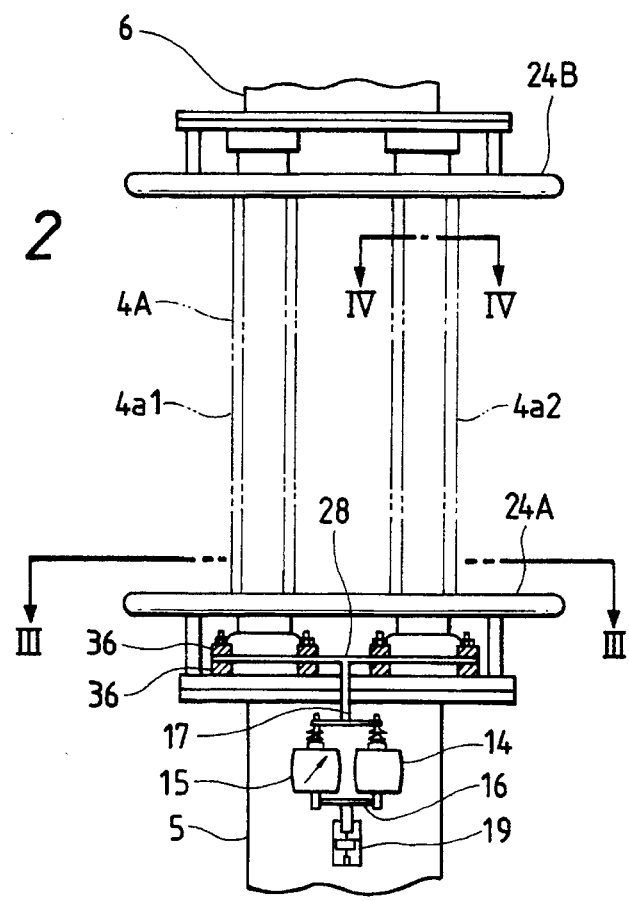
FIG. 2 is a detailed construction of an arrester unit of the thyristor valve arrester shown in FIG. 1.
Figure 3:
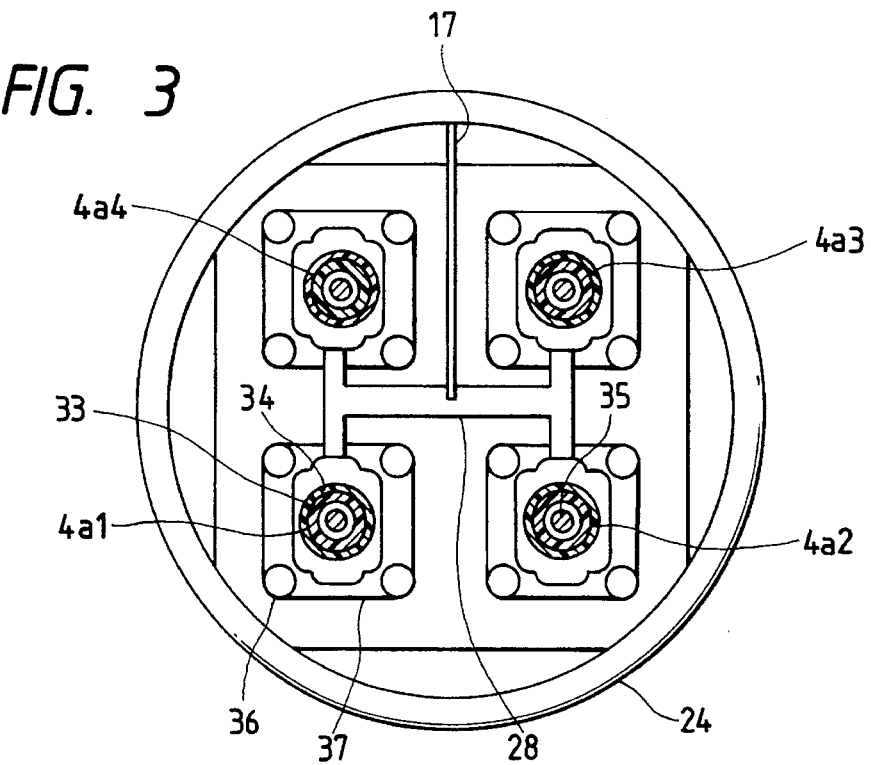
FIG. 3 is a cross-sectional view taken across III—III of the arrester set shown in FIG. 2.
Figure 4:
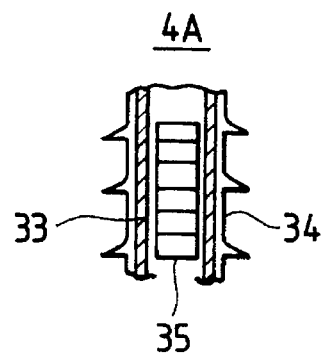
FIG. 4 is a cross-sectional view taken across IV—IV of the thyristor valve arrester unit shown in FIG. 2.

The following describes the thyristor valve arrester LA in detail by reference to FIGS. 2 to 4. As the arrester sets 4A to 4D are structured in virtually the same construction, only the arrester set 4A is described below.

The arrester set 4A, as shown in FIG. 3, is formed of four arrester units 4a1, 4a2, 4a3, and 4a4 which are arranged in parallel at the respective vertexes of a virtual square.

As shown in FIG. 2, the inter-stage connecting conductors 5 and 6 arranged on and under the arrester set 4A formed of the four arrester units 4a1, 4a2, 4a3, and 4a4 arranged in parallel have electric field relaxing shields 24A and 24B fixed thereon to enclose the upper and lower ends of the arrester units 4a1, 4a2, 4a3, and 4a4 to relax the respective electric fields. The leakage current ammeter 15 and the surge counter 14 are placed in parallel, and lower terminals thereof are connected with the inter-stage connecting conductor 5 through the conductor 16. That is, the conductor 16 and the inter-stage connecting conductor 5 are electrically connected therebetween through an operation recorder 19 for recording the operation of the arrester set 4A.

Upper terminals of the leakage current ammeter 15 and the surge counter 14 are connected to lower ends of the arrester units 4a1, 4a2, 4a3, and 4a4 through the conductor 17. In more detail, there is provided a common conductor 28 fixed on the upper flange of the inter-stage connecting conductor 5 through an insulator 36, and the common conductor 28 has the conductor 17 connected thereto.

The common conductor 28, as shown in FIG. 3, electrically connects four connecting plates 37 which are electrically connected with lower ends of arrester elements 33 placed at the lowest ends of the arrester units 4a1, 4a2, 4a3, and 4a4. The lower ends of arrester elements 33 placed at the lowest ends of the arrester units 4a1, 4a2, 4a3, and 4a4 are electrically insulated from the inter-stage connecting conductor 5 by the insulator 36. The upper end of the arrester set 4A is also constructed as described above. As a result, the arrester elements 33 of the arrester units 4a1, 4a2, 4a3, and 4a4 are electrically connected in parallel between the common conductors 28 placed at the highest ends and the lowest ends of the arrester units 4a1, 4a2, 4a3, and 4a4. As the other arrester sets 4B, 4C, and 4D are also constructed as described above, redundant description of them is omitted here.

Each of the arrester units 4a1, 4a2, 4a3, and 4a4, as shown in the longitudinal cross-sectioned view of FIG. 4, is constructed in a way that a plurality of arrester elements 35 of zinc oxide are laminated in an insulating pipe 33 made of fiber reinforced plastics. The insulating pipe 33 is covered with a wrinkled insulating coat 34 made of, for example, plastic such as a silicon polymer. As the insulating pipe 33 of fiber reinforced plastics is lighter than bushing, the thyristor valve arrestor LA is increased in the earthquake resistance. The wrinkled insulating coat 34 keeps a withstand voltage of the insulating pipe 33 from being dropped by contamination.

Figure 5:
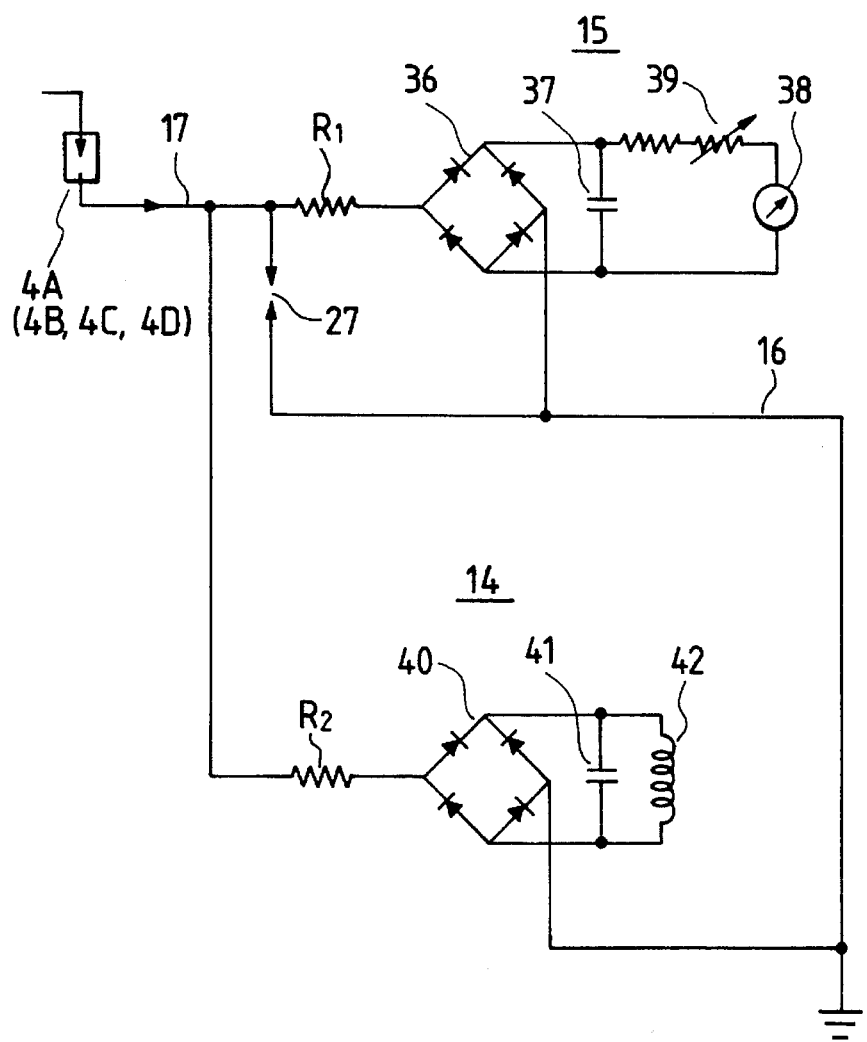
FIG. 5 is a circuit diagram illustrating a surge counter and a leakage current ammeter.

In turn, the following describes the electrically parallel construction of the leakage current ammeter 15 and the surge counter 14 in the thyristor valve arrester LA by reference to FIG. 5. Each of the arrester sets 4A, 4B, 4C, and 4D has the leakage current ammeter 15 having an internal resistor R1 connected in series therewith. Each of the arrester sets 4A, 4B, 4C, and 4D also has a surge counter 14 having an internal resistor R2 connected in series therewith through a protecting gap 27. A current shunted to the leakage current ammeter 15 by the internal resistors R1 and R2 is made to pass a rectifier 36 before being charged into a capacitor 37. The current then is made to flow to an indicator 38 through a resistor 39. The shunting ratio of the internal resistors R1 and R2 can be appropriately selected so easily that the indicator 38 of the leakage current ammeter 15 can indicate a translocation vibrating current and the leakage current in a wide range of 2 to 200 mA. As the surge counter 14 and the leakage current ammeter 15 are connected in parallel, the arrester leakage current is shunted. If the arrester leakage current is 100 mA, for example, 80 mA flows to the leakage current ammeter 15 and the remaining 20 mA to the surge counter 14. Instruments for the surge counter 14 and the leakage current ammeter 15 are sufficient to endure the respective shunt currents. This means that the instruments can be made smaller and cheaper.

The leakage current of the thyristor valve arrester LA is made transient by the translocation vibrating current of the thyristor valves 2A to 2D. The transition current, however, can be suppressed by the capacitor 37 before coming to the indicator 38 so that the needle of the indicator 38 of the leakage current ammeter 15 can be statically read.

The surge counter 14 is formed of a rectifier 40, a capacitor 41, and a counter drive coil 42 to count a surge current. As the leakage current ammeter 15 and the surge counter 14 are electrically connected in parallel, even if the leakage current ammeter 15 is broken by some cause, a discharge current is made to flow through the surge counter 14 connected in parallel, thereby permitting the normal operation to continue. An operator, thus, can easily check the operation of the thyristor valve arrester LA by externally seeing deflection of the leakage current ammeter 15 and a value counted on the surge counter 14. This means that the component reliability can be increased.

Figure 6:
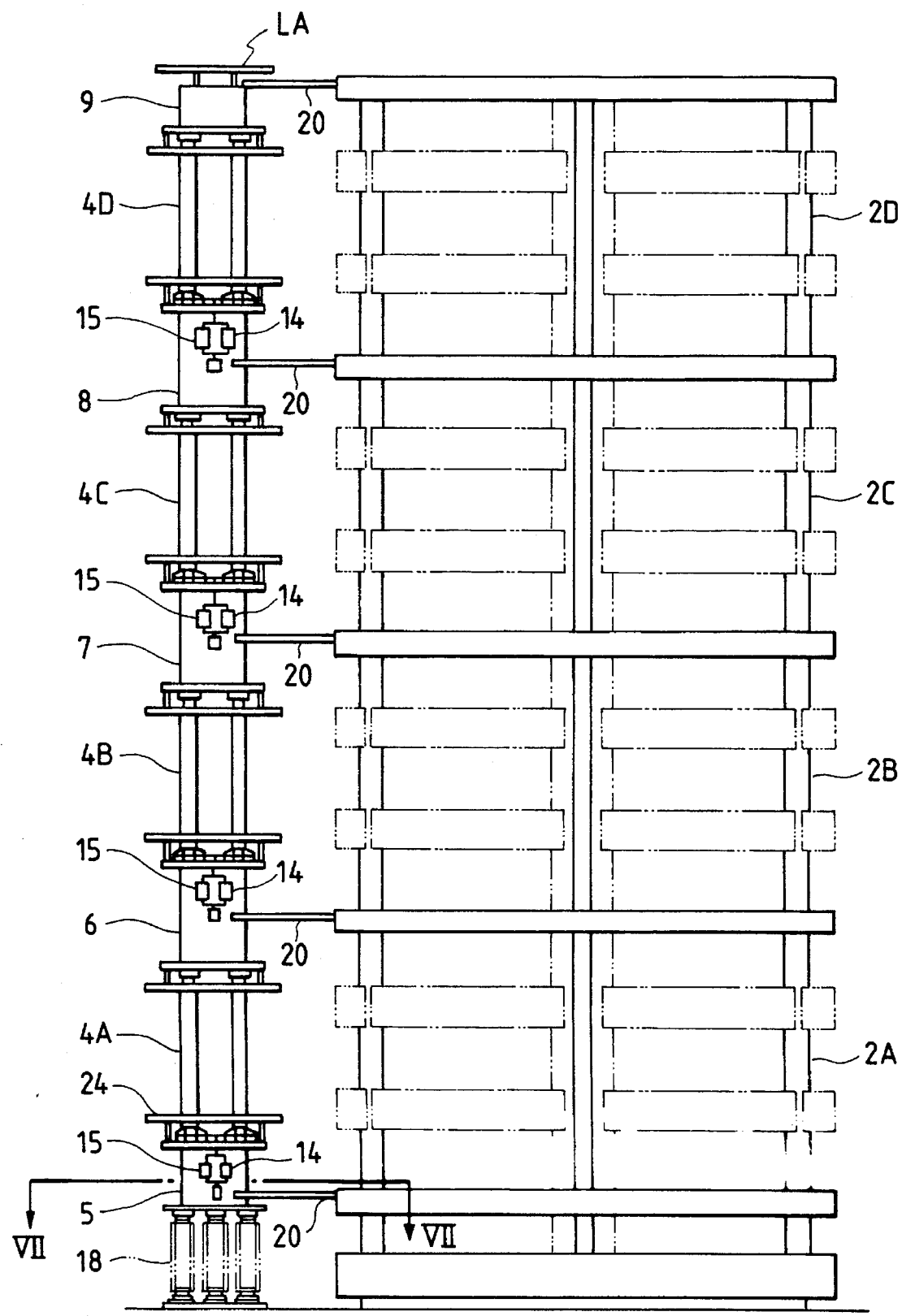
FIG. 6 is a front view illustrating a detailed construction of an example of the DC power transmission thyristor valve of the present invention.

FIG. 6 depicts the DC power transmission thyristor valve formed by combination of the above-described thyristor valve arrestor LA and the four thyristor valve stages 2A to 2D. Arrangements and parts in the figure identical with those in FIG. 1 are indicated by the same symbols as in FIG. 1.

As shown in FIG. 6, the four-stage thyristor valve arrestor LA and the four thyristor valve stages 2A to 2D are arranged in parallel and electrically connected therebetween by thyristor valve connecting conductors 20 which are made of a plurality of rigid matters so as to correspond to the one in FIG. 1. In more detail, as shown in FIG. 7, the inter-stage connecting conductor 5 has a bracket 5a 351 fixed thereto. The bracket 5a has ends of a plurality of thyristor valve connecting conductors 20a, 20b, 20c, and 20d connected thereto electrically and mechanically. The other ends of the thyristor valve connecting conductors 20a, 20b, 20c, and 20d are connected to a terminal of the thyristor valve 2A electrically and mechanically.

With the DC power transmission thyristor valve, the four-stage thyristor valve arrester LA is placed in parallel adjacent to the four thyristor valve stages 2A to 2D. The thyristor valve arrester LA also has the inter-stage connecting conductors 5 to 9 provided among the four arrester sets 4A to 4D. For this reason, axial lengths of the inter-stage connecting conductors 5 to 9 can be adjusted to make the inter-stage connecting conductors 5 to 9 correspond to the terminals of the thyristor valves 2A to 2D.

The four arrester sets 4A to 4D having the plurality of arrester units arranged in parallel can increase the earthquake resistance to a great extent as compared with the conventional arrester having four stacked stages single-arrester-unit stages. For the lowest stage, as an example, the plurality of arrester units 4a1 to 4a4 can be arranged at the respective vertexes of the virtual square at appropriate intervals to make the structure highly resistive to earthquakes. Note that an insulation distance G between the thyristor valves and the inter-stage connecting conductors should be 1 to 1.5 m. The thyristor valves 2A to 2D and the thyristor valve arrester LA can be easily connected therebetween by simple short conductors, such as the rigid thyristor valve connecting conductors 20a to 20d of circular cross section. The whole installation area of the thyristor valve arrester LA and the thyristor valve stages 2A to 2D of the present invention can be made narrower than the conventional arrester and thyristor installation area.

In thyristor valve arrester LA, the bottoms of the arrester sets 4A to 4D are electrically insulated from the inter-stage connecting conductors 5 to 9 by the insulators 10 to 13, respectively. The leakage current ammeter 15 and the surge counter 14 are connected at least in parallel between the conductor 17 connected with each of the bottoms of the arrester sets 4A to 4D and the conductor 16 connected with each of the connecting conductors 5 to 9. Thus, each leakage current ammeter 15 can monitor the leakage current flowing through the respective arrester elements 33 of the arrester sets 4A to 4D.

In addition, as each of the arrester units of the arrester sets 4A to 4D is formed of the plurality of laminated arrester elements 35 of zinc oxide in the insulating pipes 33 of fiber reinforced plastics, the structure can be made lighter and stiffer than that of the bushings. Note that if the structure may not be made lighter, the insulating pipes 33 can be replaced with bushings.

While both the thyristor valve arrester and the thyristor valve in the embodiment described above are made of four stages, the present invention is not limited thereto or thereby. Also, while the numbers of the arrester units of the arrester sets 4A to 4D of the thyristor valve arrester in the embodiment described above are four each, the present invention is not limited thereto or thereby.

As the thyristor valve arrester has the insulator between each arrester set and the respective connecting conductor and has the leakage current ammeter and the surge counter connected in parallel between each arrester set and the respective connecting conductors, the leakage current can be measured easily and accurately. Should the leakage current ammeter be broken, the surge counter can keep connection between the arrester set and the connecting conductor, thereby increasing the reliability of the apparatus.

As the thyristor valve of the present invention has the multi-stage thyristor valve arrester arranged in the vicinity of the multi-stage thyristor valve and has the inter-stage connecting conductors provided among the multiple of arrester sets, the axial lengths of the inter-stage connecting conductors can be adjusted. This allows the inter-stage connecting conductors to correspond to the terminals of the thyristor valves, thereby making easy connection of the thyristor valve arrester and the thyristor valve through the thyristor valve conductors of simple form. Also, the whole installation area can be made narrower than that of the prior art.

What is claimed is:

1. A thyristor valve arrester for connection to a multi-stage thyristor valve, comprising:

a plurality of arrester sets;

a plurality of inter-stage connecting conductors respectively arranged adjacent to one of the arrester sets through an insulator, a subset of the inter-stage connecting conductors further being respectively arranged between successive arrester sets, and the arrester sets and the inter-stage connecting conductors being stacked virtually vertically; and a leakage current ammeter and a surge counter electrically connected in parallel between one end of each of the arrester sets and an inter-stage connecting conductor adjacently arranged.

2. A thyristor valve arrester for connection to a multi-stage thyristor valve, comprising:

a plurality of arrester sets, each including a plurality of arrester units arranged in parallel; and a plurality of inter-stage connecting conductors respectively arranged adjacent to one of the arrester sets through an insulator, a subset of the inter-stage connecting conductors being further respectively arranged between successive arrester sets;

wherein the arrester sets and the inter-stage connecting conductors are stacked virtually vertically.

3. The thyristor valve arrester according to claim 2, wherein:

each of the arrester units has arrester elements arranged in an insulating pipe made of fiber-reinforced plastics.

4. A thyristor valve assembly, comprising:

an arrester set;

a pair of inter-stage connecting conductors connected respectively to opposing sides of the arrester set;

a thyristor valve connected to each inter-stage connecting conductor; and a leakage current ammeter connected between one end of the arrester set and one of the inter-stage connecting conductors.

5. The thyristor valve assembly according to claim 4, further comprising:

a surge counter connected in parallel with the leakage current ammeter.

6. A DC power transmission thyristor valve assembly, comprising:

a plurality of thyristor valve stages;

a plurality of arrester set stages;

a plurality of thyristor valve connecting conductors for connecting the thyristor valve stages with corresponding arrester set stages;

a plurality of inter-stage connecting conductors respectively arranged adjacent to one of the arrester set stages through an insulator, a subset of the plurality of inter-stage connecting conductors further being respectively arranged between successive arrester set stages, the arrester sets and the inter-stage connecting conductors being stacked virtually vertically, and the thyristor valve arrester stages being collectively arranged in parallel with the thyristor valve stages; and a leakage current ammeter and a surge counter electrically connected in parallel between one end of each of the arrester sets and an inter-stage connecting conductor adjacently arranged.

7. The DC power transmission thyristor valve assembly according to claim 6, wherein:

the thyristor valve connecting conductor connecting each of the thyristor valve stages with an arrester set stage has one end thereof connected to an inter-stage connecting conductor.

8. A DC power transmission thyristor valve assembly, comprising:

a plurality of thyristor valve stages;

a plurality of arrester set stages each of the arrester set stages having a plurality of arrester units arranged in parallel;

a plurality of thyristor valve connecting conductors for connecting the thyristor valve stages with corresponding arrester set stages; and a plurality of inter-stage connecting conductors arranged adjacent to one of the arrester set stages through an insulator, a subset of said plurality of inter-stage connecting conductors further being respectively arranged between successive arrester set stages, and the arrester sets and the inter-stage connecting conductors being stacked virtually vertically and in parallel with the thyristor valve stages.

9. A DC power transmission thyristor valve, comprising:

a plurality of thyristor valve stages;

a plurality of arrester set stages each of the arrester set stages having a plurality of arrester units arranged in parallel;

a plurality of thyristor valve connecting conductors for connecting the thyristor valve stages with corresponding arrester set stages;

a plurality of inter-stage connecting conductors respectively arranged adjacent to one of the arrester set stages through an insulator, a subset of the plurality of inter-stage connecting conductors being further respectively arranged between successive arrester set stages, and the arrester sets and the inter-stage connecting conductors being stacked virtually vertically in parallel with the thyristor valve stages; and a plurality of leakage current ammeters and surge counters respectively electrically connected in parallel between one end each of the arrester units and one of the thyristor valve conductors;

wherein each of the thyristor valve connecting conductors is made of a plurality of rigid matters.

* * * * *